US011967778B2

(12) United States Patent
Qu et al.

(10) Patent No.: US 11,967,778 B2
(45) Date of Patent: Apr. 23, 2024

(54) PACKAGING STRUCTURE, NETWORK DEVICE, AND TERMINAL DEVICE

(71) Applicant: HUAWEI TECHNOLOGIES CO., LTD., Guangdong (CN)

(72) Inventors: Heng Qu, Shanghai (CN); Meijuan Fu, Shanghai (CN); Liguo Zhang, Shanghai (CN); Ying Kang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 228 days.

(21) Appl. No.: 17/536,332

(22) Filed: Nov. 29, 2021

(65) Prior Publication Data

US 2022/0085509 A1 Mar. 17, 2022

Related U.S. Application Data

(63) Continuation of application No. PCT/CN2019/089208, filed on May 30, 2019.

(51) Int. Cl.
*H01Q 9/04* (2006.01)
*H01Q 1/24* (2006.01)
*H01Q 1/38* (2006.01)

(52) U.S. Cl.
CPC .......... *H01Q 9/0414* (2013.01); *H01Q 1/243* (2013.01); *H01Q 1/38* (2013.01)

(58) Field of Classification Search
CPC ........ H01Q 9/0414; H01Q 1/243; H01Q 1/38; H01Q 9/045; H01Q 1/2283; H01Q 9/0407; H01Q 23/00; H01L 2223/6677; H01L 23/66

See application file for complete search history.

(56) References Cited

U.S. PATENT DOCUMENTS

2016/0049723 A1 2/2016 Baks et al.
2016/0056544 A1* 2/2016 Garcia ................ H01Q 9/0407 343/725

(Continued)

FOREIGN PATENT DOCUMENTS

CN 101496298 A 7/2009
CN 201435450 Y 3/2010
CN 104662737 A 5/2015

(Continued)

OTHER PUBLICATIONS

You Baiqiang et al., "Modern antenna practical design technology", Sep. 12, 2016, total: 1 page.

(Continued)

*Primary Examiner* — David E Lotter

(57) ABSTRACT

This application provides a packaging structure, including an antenna in package and a radio frequency chip that are packaged together, where the antenna in package is fastened on the radio frequency chip. The antenna in package includes a radiator and at least two feeding parts, the at least two feeding parts are electrically connected to the radio frequency chip, the radio frequency chip is configured to receive or transmit a radio frequency signal, and at least one of the at least two feeding parts provides differential feeding for the radiator. This application further provides a network device and a terminal device, to reduce an antenna size and make the antenna easier to mount.

20 Claims, 13 Drawing Sheets

(56) References Cited

U.S. PATENT DOCUMENTS

| | | | | |
|---|---|---|---|---|
| 2019/0020100 | A1* | 1/2019 | Jong | H01Q 1/48 |
| 2019/0157762 | A1* | 5/2019 | Shibata | H01Q 5/307 |

FOREIGN PATENT DOCUMENTS

| | | | |
|---|---|---|---|
| CN | 105552550 | A | 5/2016 |
| CN | 108054163 | A | 5/2018 |
| CN | 108879114 | A | 11/2018 |
| CN | 109088180 | A | 12/2018 |
| CN | 109244641 | A | 1/2019 |
| CN | 109256612 | A | 1/2019 |
| CN | 109449141 | A | 3/2019 |
| CN | 109638459 | A | 4/2019 |
| CN | 109687165 | A | 4/2019 |
| CN | 109687166 | A | 4/2019 |
| CN | 109712947 | A | 5/2019 |
| GB | 2559001 | A | 7/2018 |

OTHER PUBLICATIONS

Lu Jiaguo et al., “Synthetic aperture radar design technology”,Apr. 2017, total: 1 page.

Office Action dated Jun. 16, 2022 for Chinese Application No. 201980089078, 15 pages.

PCT Search Report for PCT/CN2019/089208 dated May 30, 2019, 8 pages.

Chinese Office Action for Application No. 201980089078.6 dated Dec. 29, 2021, 9 pages.

* cited by examiner

PACKAGING STRUCTURE, NETWORK DEVICE, AND TERMINAL DEVICE

CROSS-REFERENCE TO RELATED APPLICATIONS

This application is a continuation of International Application No. PCT/CN2019/089208, filed on May 30, 2019, the disclosure of which is hereby incorporated by reference in its entirety.

TECHNICAL FIELD

This application relates to the communications field, and more specifically, to a packaging structure, a network device, and a terminal device.

BACKGROUND

A dual-polarized antenna attracts increasing attention due to many advantages. For example, the dual-polarized antenna combines two antennas that are mutually orthogonal in +45° and −45° polarization directions. Polarization orthogonality of ±45° makes a degree of isolation between the two antennas of +45° and −45° easier to meet a requirement, and therefore, space isolation between dual-polarized antennas is close. The dual-polarized antenna can work in both a transmit mode and a receive mode, and can serve more users without changing a quantity of used antennas. The dual-polarized antenna has an advantage of a remote electrical tilt antenna, and can improve service quality of a communications network. However, performance of the dual-polarized antenna in all aspects still needs to be further optimized, such as reducing an antenna size, increasing a bandwidth, increasing a gain, increasing a degree of isolation, and reducing an interconnection loss.

SUMMARY

This application provides a packaging structure, a network device, and a terminal device, to provide a solution that can further improve antenna performance.

According to a first aspect, a packaging structure is provided, including: an antenna in package (AiP) and a radio frequency chip that are packaged together, where the antenna in package is fastened on the radio frequency chip, and the antenna in package includes a radiator and at least two feeding parts, the at least two feeding parts are electrically connected to the radio frequency chip, the radio frequency chip is configured to receive or transmit a radio frequency signal, and at least one of the at least two feeding parts provides differential feeding for the radiator.

The packaging structure may be applied to a network device or a terminal device, so that the network device or the terminal device may work in various communications systems.

In this embodiment of this application, the packaging structure may include an antenna in package and a radio frequency chip that are packaged into a whole. Packaging the antenna in package and the radio frequency chip may, in addition to reducing a size of the packaging structure to facilitate mounting, further increase a degree of isolation of the packaging structure by using a feeding network to provide a margin for processing the packaging structure. Further, the antenna provided in this embodiment of this application is integrated in the packaging structure of a chip, and a distance between components is close. In this case, differential feeding is provided by using two feeding parts, so that external interference of an antenna radiator can be offset from each other, which is more conducive to stability of a packaging environment.

The radio frequency chip provides a feed, and feeds the radiator by using a first pin and a first feeding part, to form a first antenna, where the first antenna may work in a first operating frequency band. The radio frequency chip provides a feed, and feeds the radiator by using a second pin and a second feeding part, to form a second antenna, where the second antenna may work in a second operating frequency band.

To enable the antenna to have antenna performance such as a specific bandwidth, a specific degree of isolation, and a specific gain, a spacing between the first feeding part and the radiator may be different from a spacing between the second feeding part and the radiator.

With reference to the first aspect, in some implementations of the first aspect, the antenna in package further includes a first packaging material, and the radiator and the at least two feeding parts are accommodated in the first packaging material.

In this embodiment of this application, the radiator, a plurality of feeding parts, and the like may be coated by using the first packaging material, to form a whole to strengthen a packaging effect and facilitate mounting.

With reference to the first aspect, in some implementations of the first aspect, the packaging structure further includes a second packaging material, and the second packaging material is used to coat a welding material disposed between the radio frequency chip and the antenna in package.

In this embodiment of this application, a welding material that is likely to be damaged may be coated by using the second packaging material, ensuring stability of an electrical connection between the radio frequency chip and the antenna in package, strengthening a packaging effect, and facilitating mounting.

With reference to the first aspect, in some implementations of the first aspect, the packaging structure further includes a third packaging material, and the radio frequency chip and the antenna in package are accommodated in the third packaging material.

In this embodiment of this application, the radio frequency chip and the antenna in package may be coated, or the radio frequency chip, the radiator, the plurality of feeding parts, and the like may be coated by using the third packaging material, to form a whole to strengthen a packaging effect and facilitate mounting.

With reference to the first aspect, in some implementations of the first aspect, the at least two feeding parts include the first feeding part. The first feeding part provides deferential feeding for the radiator, and the first feeding part includes a first feeding point and a second feeding point that are electrically connected to the radiator.

In this embodiment of this application, the first feeding part includes the first feeding point and the second feeding point. The first feeding point and the second feeding point may form a first resonance point and a second resonance point. The first resonance point and the second resonance point correspond to a first return loss low point and a second return loss low point, and the first resonance point and the second resonance point are combined to form a return loss low point that is lower than the first return loss low point and the second return loss low point. Therefore, the feeding network may reduce a return loss of the antenna and optimize a degree of isolation of the antenna. Because of existence of the first resonance point and the second resonance point, a frequency band that is near the first resonance point and the second resonance point, and that meets requirements of a return loss and a degree of isolation may be superposed. This increases a bandwidth of the antenna.

In this embodiment of this application, a length of a conducting wire from the first feeding point to the first pin is a first conducting wire length, and a length of a conducting wire from the second feeding point to the first pin is a second conducting wire length. A difference between the first conducting wire length and the second conducting wire length is related to antenna performance such as a bandwidth, a degree of isolation, and a gain that are of the antenna. Both a width of the conducting wire from the first feeding point to the first pin and a width of the conducting wire from the second feeding point to the first pin are also related to antenna performance such as a bandwidth, a degree of isolation, and a gain that are of the antenna. In other words, a length and a width of a conducting wire from a feeding point to a pin may be adjusted so that the antenna has antenna performance such as a specific bandwidth, a specific degree of isolation, and a specific gain.

With reference to the first aspect, in some implementations of the first aspect, the antenna in package further includes a multi-layer substrate, which includes a first substrate on which at least one of the at least two feeding parts is disposed.

A substrate includes a conductor. A material of the conductor may be, for example, copper foil.

In this embodiment of this application, feeding parts are arranged on substrates, and an electrical connection path in the packaging structure is implemented by using a circuit inside the substrate.

With reference to the first aspect, in some implementations of the first aspect, the multi-layer substrate further includes a second substrate disposed between the first substrate and the radiator.

In this embodiment of this application, the second substrate may increase a degree of isolation between the radiator and the feeding part.

With reference to the first aspect, in some implementations of the first aspect, the multi-layer substrate further includes a third substrate disposed between the first substrate and the radio frequency chip.

In this embodiment of this application, the third substrate may shield a signal between the feeding parts and the radio frequency chip.

With reference to the first aspect, in some implementations of the first aspect, the at least two feeding parts are disposed on different substrates.

In this embodiment of this application, arranging the at least two feeding parts on different substrates may improve flexibility of arranging the feeding parts.

With reference to the first aspect, in some implementations of the first aspect, the multi-layer substrate further includes a fourth substrate disposed between the at least two feeding parts.

In this embodiment of this application, at least one layer of substrate is disposed between the first feeding part and the second feeding part, so that a degree of isolation between the first feeding part and the second feeding part can be further increased.

With reference to the first aspect, in some implementations of the first aspect, one layer of substrate of the multi-layer substrate is a ground plate.

In this embodiment of this application, grounding one layer of substrate may enable the antenna to shield clutter in an environment, and the service performance of the antenna is improved accordingly. Generally, a larger area of the ground plate indicates a better effect of shielding clutter.

With reference to the first aspect, in some implementations of the first aspect, the multi-layer substrate includes N layers of substrates and M layers of substrates that are different from the N layers of substrates. The antenna in package further includes a fourth packaging material. The fourth packaging material is used to connect and accommodate the N layers of substrates and the M layers of substrates, and both N and M are integers greater than 1.

In an example, the antenna in package includes a first substrate stack and a second substrate stack, where the first substrate stack includes five layers of substrates, the second substrate stack includes five layers of substrates, and a pin on the first substrate stack is electrically connected to a pin on the second substrate stack; and a packaging material coats the first substrate stack and the second substrate stack. A ten-layer substrate is processed by dividing the ten-layer substrate into two five-layer substrates. Compared with a processing technology of directly processing the ten-layer substrate, a processing technology of processing the two five-layer substrates is less difficult.

In this embodiment of this application, the two substrate stacks are packaged into a whole by using the packaging material, strengthening a packaging effect and facilitating mounting.

With reference to the first aspect, in some implementations of the first aspect, the multi-layer substrate is a ten-layer substrate. A thickness of each layer of substrate of the multi-layer substrate is 100 μm, and a thickness of a conducting layer on each layer of substrate is 15 μm.

In this embodiment of this application, using the multi-layer substrate may implement that, in a range from 57 GHz to 71 GHz, a return loss of the packaging structure is below −15 dB, a degree of isolation is below −40 dB, a bandwidth reaches approximately 15 GHz, and a bandwidth percentage is approximately 25%. In addition, a gain of the packaging structure is approximately 6 dBi. Because the packaging structure has excellent antenna performance, a processing margin is reserved for the packaging structure.

With reference to the first aspect, in some implementations of the first aspect, the packaging structure further includes a parasitic patch, which is attached to the antenna in package and coupled to the radiator for feeding.

In an example, the parasitic patch is a parasitic patch group that includes a plurality of parasitic patch units. A flatter impedance curve may be obtained, which is more convenient for matching, and further, a bandwidth can be increased. This improves overall radiation performance of the antenna.

With reference to the first aspect, in some implementations of the first aspect, the packaging structure further includes a fifth packaging material, and the antenna in package, the radio frequency chip, and the parasitic patch are accommodated in the fifth packaging material.

In this embodiment of this application, the antenna in package, the radio frequency chip, and the parasitic patch are packaged into a whole by using the fifth packaging material, strengthening a packaging effect and facilitating mounting.

With reference to the first aspect, in some implementations of the first aspect, isolation vias are provided on a material that coats the at least two feeding parts.

A material of the isolation vias is generally a conductive material such as metal. The isolation vias may further increase a degree of isolation between the at least two feeding parts.

According to a second aspect, a network device is provided, including the packaging structure in the first aspect and any possible implementation of the first aspect.

According to a third aspect, a terminal device is provided, including the packaging structure in the first aspect and any possible implementation of the first aspect.

DESCRIPTION OF EMBODIMENTS

The following describes the technical solutions of this application with reference to the accompanying drawings.

A terminal device in the embodiments of this application may also be referred to as user equipment, an access terminal, a subscriber unit, a subscriber station, a mobile station, a remote station, a remote terminal, a mobile device, a user terminal, a terminal, a wireless communication device, a user agent, and/or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with the terminal device. The network device may be a base transceiver station (BTS) in the global system for mobile communications (GSM) or the code division multiple access (CDMA) system, may be a NodeB (NB) in the wideband code division multiple access (WCDMA) system, may be an evolved NodeB (eNB or eNodeB) in the LTE system, or may be a radio controller in a cloud radio access network (CRAN) scenario. Alternatively, the network device may be a relay node, an access point, a vehicle-mounted device, a wearable device, a network device in the future 5G network, a network device in a future evolved PLMN network, or the like. This is not limited in the embodiments of this application.

Figure 1:
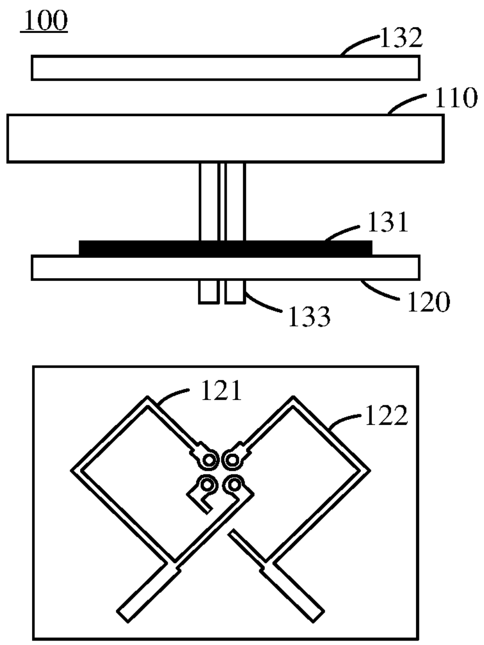
FIG. 1 is an example schematic diagram of a structure of a dual-polarized antenna radiating element.

FIG. 1 shows a common dual-polarized antenna radiating element 100. The dual-polarized antenna radiating element 100 generally includes a radiator 110, a feeding network 121 in a −45° polarization direction, a feeding network 122 in a +45° polarization direction, a ground plate 131, a parasitic patch 132, and a pin 133. A feeding network 120 shown in FIG. 1 may include the feeding network 121 in the −45° polarization direction and the feeding network 122 in the +45° polarization direction. The upper diagram in FIG. 1 is a front view of the dual-polarized antenna radiating element 100, and the lower diagram in FIG. 1 is a top view of the feeding network 120.

In addition, to describe a structure of the antenna more clearly, unless otherwise stated, a display manner similar to that in FIG. 1 is used to display the structure of the antenna. To be specific, in the same diagram, the upper diagram is a front view of the antenna, and the lower diagram is a top view of a feeding unit.

The pin 133 provides a feed for the feeding network 121 in the −45° polarization direction and the feeding network 122 in the +45° polarization direction, and further, the feeding network 121 in the −45° polarization direction and the feeding network 122 in the +45° polarization direction provide a feed for the radiator 110, so that the radiator 110 may work in both a receive mode and a transmit mode. The feeding network 121 in the −45° polarization direction provides a −45° polarization radiation electromagnetic wave, and the feeding network 122 in the +45° polarization direction provides a +45° polarization radiation electromagnetic wave.

The parasitic patch 132 is coupled to the radiator 110 for feeding, and is configured to increase a bandwidth of the dual-polarized antenna radiating element 100.

The ground plate 131 is insulated from both the feeding network 121 in the −45° polarization direction and the feeding network 122 in the +45° polarization direction, and the ground plate 131 is configured to eliminate impact of clutter in an ambient environment.

Therefore, the dual-polarized antenna radiating element 100 shown in FIG. 1 has excellent antenna performance, such as a wide bandwidth range, a high degree of polarization isolation, and a low return loss.

To further improve service performance of the dual-polarized antenna radiating element, this application provides a packaging structure to reduce a size of the dual-polarized antenna radiating element, so that the dual-polarized antenna radiating element is easier to mount. Further, a size of an electronic device that uses the packaging structure may be reduced.

Figure 2:
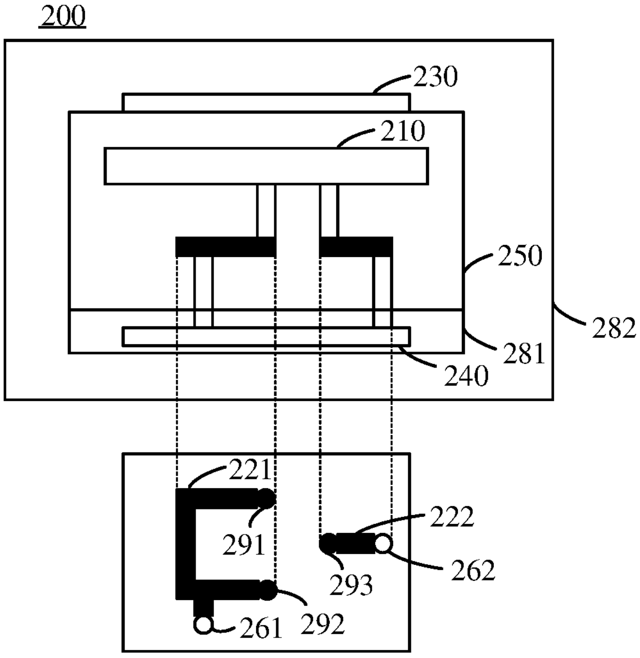
FIG. 2 is an example schematic diagram of a structure of a packaging structure according to an embodiment of this application.
Figure 3:
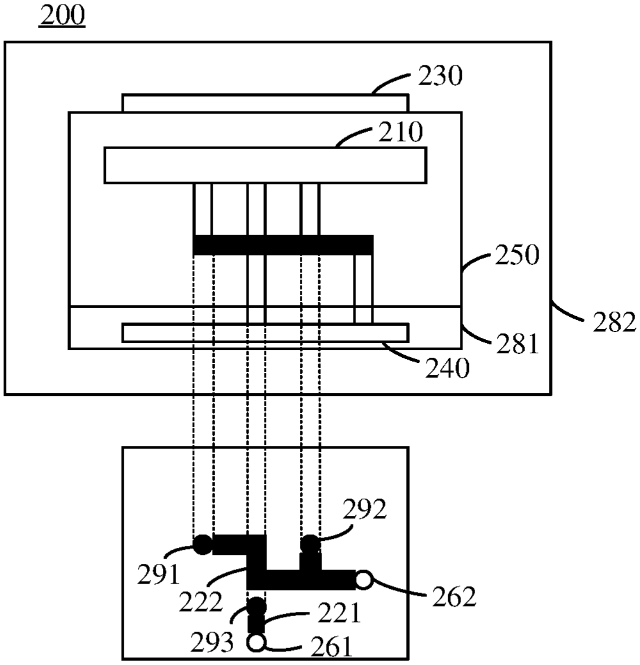
FIG. 3 is an example schematic diagram of a structure of a packaging structure according to an embodiment of this application.
Figure 4:
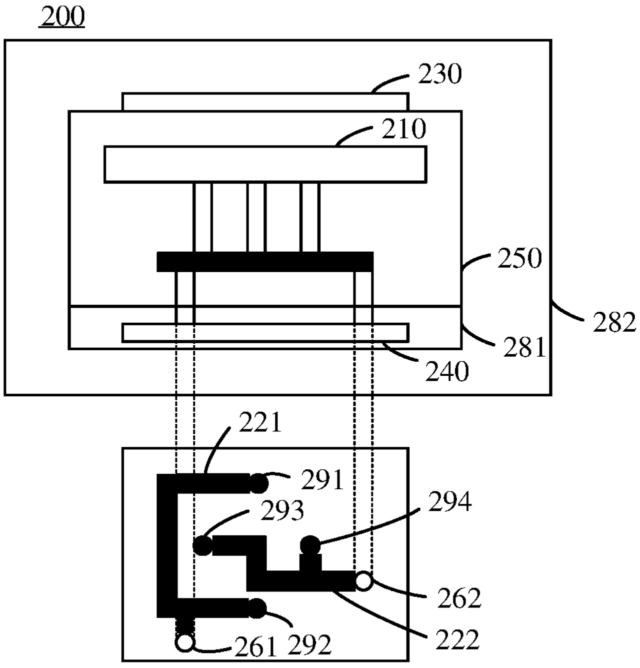
FIG. 4 is an example schematic diagram of a structure of a packaging structure according to an embodiment of this application.

FIG. 2 to FIG. 4 are schematic diagrams of a packaging structure according to this application. A packaging structure 200 may be applied to a network device or a terminal device, so that the network device or the terminal device may work in various communications systems.

The packaging structure 200 may include an antenna 250 in package and a radio frequency chip 240 that are packaged into a whole. Packaging the antenna 250 in package and the radio frequency chip 240 may, in addition to reducing a size of the packaging structure to facilitate mounting, further increase a degree of isolation of the packaging structure to provide a margin for processing the packaging structure.

The radio frequency chip 240 is configured to provide a feed for a radiator 210 in the antenna 250 in package. The radio frequency chip 240 is attached to the antenna 250 in package and is packaged together with the antenna 250 in package into a whole. The radio frequency chip 240 may be electrically connected to the radiator 210 in the antenna 250 in package by using conductive materials such as a probe and copper foil. For example, the radio frequency chip 240 may be attached to the antenna 250 in package by adhesive and electrically connected to the antenna 250 in package by using a solder ball disposed on the radiator 210. For example, the radio frequency chip 240 may be fastened on the antenna 250 in package by using a solder ball disposed on the radiator 210 and electrically connected to the antenna 250 in package.

The antenna 250 in package includes the radiator 210, a first feeding part 221, a second feeding part 222, a first pin 261, a second pin 262, and a dielectric material. The black solid pattern is used to indicate the first feeding part 221, the second feeding part 222, or a feeding point electrically connected to the radiator 210. Dotted lines shown in FIG. 2 indicate a correspondence between the first feeding part 221 and the second feeding part 222 that are located in the upper diagram and the first feeding part 221 and the second feeding part 222 that are located in the lower diagram. Dotted lines shown in FIG. 4 indicate a correspondence between the first pin 261 and the second pin 262 that are located in the upper diagram and the first pin 261 and the second pin 262 that are located in the lower diagram.

The dielectric material may be, for example, polytetrafluoroethylene, quartz, beryllium oxide, alumina, sapphire, garnet ferrite, potassium arsenide, titanium dioxide, and ruby. Generally, a smaller volume of the packaging structure 200 leads to a larger dielectric constant of the dielectric material. The dielectric material coats the radiator 210, the first feeding part 221, the second feeding part 222, the first pin 261, and the second pin 262.

To improve a packaging characteristic of the antenna 250 in package, packaging adhesive may alternatively be used.

The radiator 210 is configured to receive and transmit a signal.

The antenna 250 in package is electrically connected to the radio frequency chip 240 by using a conducting wire, the first pin 261, and the second pin 262, where the conducting wire is electrically connected between the antenna 250 in package and the first pin 261 or between the antenna 250 in package and the second pin 262. For example, the first pin 261 and the second pin 262 are electrically connected to pins on the radio frequency chip 240.

The radio frequency chip 240 provides a feed, and feeds the radiator 210 by using the first pin 261 and the first feeding part 221, to form a first antenna, where the first antenna may work in a first operating frequency band. The radio frequency chip 240 provides a feed, and feeds the radiator 210 by using the second pin 262 and the second feeding part 222, to form a second antenna, where the second antenna may work in a second operating frequency band. The first operating frequency band and the second operating frequency band may be the same or different. For example, the first feeding part 221 is connected to the radiator 210 to implement horizontal polarization of the first antenna, and the second feeding part 222 is connected to the radiator 210 to implement vertical polarization of the second antenna. Actually, polarization directions of a horizontal polarization antenna and a vertical polarization antenna are relative to the ground. A polarization direction of the antenna can be changed by changing a placement position of the packaging structure shown in FIG. 2 (for example, through rotation by 90° for placement).

In an example, the first feeding part 221 is electrically connected between the first pin 261 and the radiator 210, so that the radio frequency chip 240 may provide an electromagnetic wave in a horizontal polarization direction for the radiator 210 by using the first pin 261. The second feeding part 222 is electrically connected between the second pin 262 and the radiator 210, so that the radio frequency chip 240 may provide an electromagnetic wave in a vertical polarization direction for the radiator 210 by using the second pin 262.

The first antenna and the second antenna share the radio frequency chip 240 and the radiator 210. Therefore, the first antenna and the second antenna cannot be physically completely separated. The first antenna and the second antenna work in different operating frequency bands. Therefore, the first antenna and the second antenna may be logically considered as two different antennas. In other words, the first antenna and the second antenna may be physically indivisible, but logically divisible. However, the first antenna and the second antenna may alternatively be physically divisible, which is not limited in this application.

The first feeding part 221 and/or the second feeding part 222 are/is a feeding network. In other words, differential feeding is provided to one feeding part by using two feeding points, that is, the two feeding points provide feeds of different phases to the same feeding part.

The following briefly describes impact of the feeding network on the antenna.

The feeding network includes two feeding points, for example, a first feeding point and a second feeding point. The first feeding point and the second feeding point may form a first resonance point and a second resonance point. The first resonance point and the second resonance point correspond to a first return loss low point and a second return loss low point, and the first resonance point and the second resonance point are combined to form a return loss low point that is lower than the first return loss low point and the second return loss low point. Therefore, the feeding network may reduce a return loss of the antenna and optimize a degree of isolation of the antenna. Because of existence of the first resonance point and the second resonance point, a frequency band that is near the first resonance point and the second resonance point, and that meets requirements of a return loss and a degree of isolation may be superposed. This increases a bandwidth of the antenna.

The antenna in package shown in FIG. 2 is used as an example. A length of a conducting wire from a first feeding point 291 to the first pin 261 is a first conducting wire length, and a length of a conducting wire from a second feeding point 292 to the first pin 261 is a second conducting wire length. A difference between the first conducting wire length and the second conducting wire length is related to antenna performance such as a bandwidth, a degree of isolation, and a gain that are of the antenna. Both a width of the conducting wire from the first feeding point 291 to the first pin 261 and a width of the conducting wire from the second feeding point 292 to the first pin 262 are also related to antenna performance such as a bandwidth, a degree of isolation, and a gain that are of the antenna. In other words, a length and a width of a conducting wire from a feeding point to a pin may be adjusted so that the antenna has antenna performance such as a specific bandwidth, a specific degree of isolation, and a specific gain.

As shown in FIG. 2, the first feeding part 221 may be a feeding network, and the second feeding part 222 may be a feeding probe. The first feeding part 221 includes a first feeding point 291 and a second feeding point 292. The second feeding part 222 includes a third feeding point 293. The first feeding point 291 and the second feeding point 292 may form a first resonance point and a second resonance point, and the third feeding point 293 may form a third resonance point. Because the first feeding part 221 is a feeding network, a degree of isolation and a return loss of a frequency band near the first resonance point and the second resonance point may be optimized, to increase a bandwidth that meets requirements of a degree of isolation and a return loss.

As shown in FIG. 3, the first feeding part 221 may be, for example, a feeding probe, and the second feeding part 222 may be a feeding network. The second feeding part 222 includes a first feeding point 291 and a second feeding point 292. The first feeding part 221 includes a third feeding point 293. The first feeding point 291 and the second feeding point 292 may form a first resonance point and a second resonance point, and the third feeding point 293 may form a third resonance point. Because the second feeding part 222 is a feeding network, a degree of isolation and a return loss of a frequency band near the first resonance point and the second resonance point may be optimized, to increase a bandwidth that meets requirements of a degree of isolation and a return loss. Dotted lines shown in FIG. 3 indicate a correspondence between the first feeding point 291, the second feeding point 292, and the third feeding point 293 that are located in the upper diagram and the first feeding point 291, the second feeding point 292, and the third feeding point 293 that are located in the lower diagram.

As shown in FIG. 4, the first feeding part 221 is a feeding network, and the second feeding part 222 is a feeding network. The first feeding part 221 includes a first feeding point 291 and a second feeding point 292. The second feeding part 222 includes a third feeding point 293 and a fourth feeding point 294. The first feeding point 291 and the second feeding point 292 may form a first resonance point and a second resonance point. The third feeding point 293 and the fourth feeding point 294 may form a third resonance point and a fourth resonance point. Because the first feeding part 221 is a feeding network, a degree of isolation and a return loss of a frequency band near the first resonance point and the second resonance point may be optimized, to increase a bandwidth. In addition, because the second feeding part 222 is a feeding network, a degree of isolation and a return loss of a frequency band near the third resonance point and the fourth resonance point may be optimized, to increase a bandwidth that meets requirements of a degree of isolation and a return loss.

Figure 5:
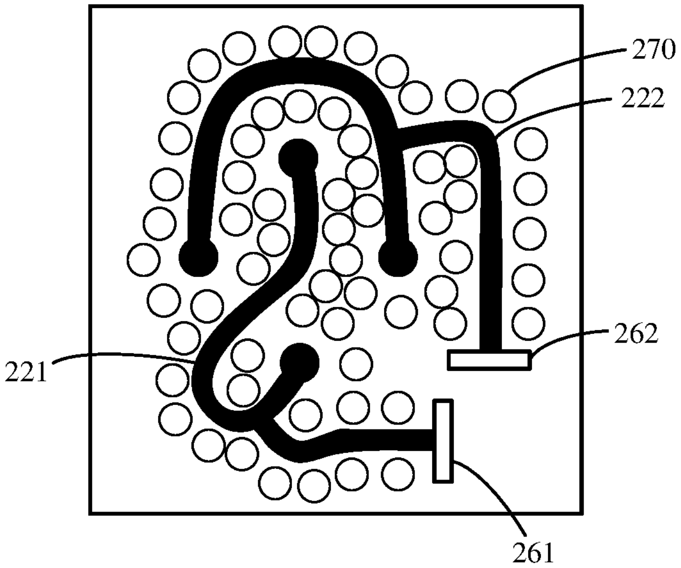
FIG. 5 is an example schematic diagram of a structure of a first feeding network and a second feeding network according to an embodiment of this application.

It should be understood that a structure of the feeding network shown in FIG. 2 to FIG. 4 is only an example. Actually, to enable the antenna to have antenna performance such as a specific bandwidth, a specific degree of isolation, and a specific gain, a winding manner of a conducting wire connected to the pin from the feeding network may be arbitrary. This application sets no limitation on the winding manner of the conducting wire connected to the pin from the feeding network. FIG. 5 shows a possible winding manner of the conducting wire. As shown in FIG. 5, both the first feeding part 221 and the second feeding part 222 are feeding networks.

It should be understood that arrangement positions of the feeding parts shown in FIG. 2 to FIG. 4 are only an example. Actually, to enable the antenna to have antenna performance such as a specific bandwidth, a specific degree of isolation, and a specific gain, a spacing between the first feeding part and the radiator may be different from a spacing between the second feeding part and the radiator. For example, the first feeding part and the second feeding part are arranged on different substrates.

Optionally, the packaging structure 200 may further include a parasitic patch 230, as shown in FIG. 2 to FIG. 4. The parasitic patch 230 may be attached to the antenna 250 in package, so that the parasitic patch 230 is packaged together with the antenna 250 in package. The parasitic patch 230 is coupled to the radiator 210 for feeding. Generally, a shape and an area of the parasitic patch 230 are related to service performance of the packaging structure 200.

In one aspect, the parasitic patch 230 may be used to enable the antenna to obtain a larger gain, to provide a margin for processing the packaging structure. In another aspect, packaging the parasitic patch 230 together with the antenna 250 in package and the radio frequency chip 240 to form a packaging structure may, in addition to reducing a size of the packaging structure to facilitate mounting, further increase a degree of isolation and a gain of the packaging structure to provide a margin for processing the packaging structure.

Figure 6:
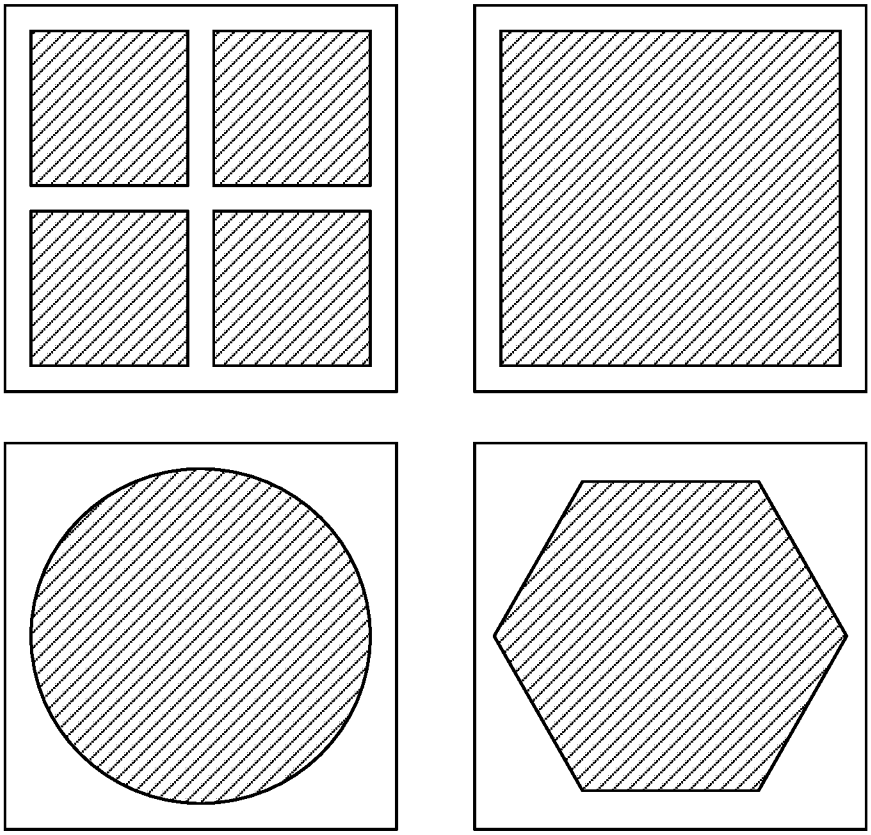
FIG. 6 is an example schematic diagram of a structure of a parasitic patch according to an embodiment of this application.

FIG. 6 shows four possible structures of the parasitic patch 230. A pattern filled with oblique lines is used to indicate a parasitic patch. It may be understood that the embodiment shown in FIG. 6 is merely intended to help the person skilled in the art better understand technical solutions of this application, but is not intended to limit the technical solutions of this application. The person skilled in the art may figure out modifications and other embodiments of this application based on the foregoing descriptions and related accompanying drawings. Therefore, it should be understood that this application is not limited to the specific embodiments disclosed.

The parasitic patch 230 may be a parasitic patch group that includes a plurality of parasitic patch units. Compared with an antenna in package including only one parasitic patch unit (a parasitic patch shown in the upper-right corner, the lower-left corner, or the lower-right corner of FIG. 6), an antenna in package including the plurality of parasitic patch units (a parasitic patch shown in the upper-left corner of FIG. 6) may obtain a flatter impedance curve, which is more convenient for matching. This increases a bandwidth and improves overall radiation performance of the antenna.

Further, isolation vias 270 (as shown in FIG. 5, for example) may be arranged between the first feeding part 221 and the second feeding part 222, to increase a degree of isolation between the first feeding part 221 and the second feeding part 222. A material of the isolation vias is generally a conductive material such as metal.

Further, to improve antenna performance of the packaging structure 200, the antenna 250 in package may include a multi-layer substrate. A substrate includes a conductor. A material of the conductor may be, for example, copper foil.

For example, the first feeding part and the second feeding part are respectively disposed on two layers of substrates. Arranging the first feeding part and the second feeding part on different substrates may improve flexibility of arranging the feeding parts.

For another example, at least one layer of substrate is disposed between the radiator and the first feeding part or the second feeding part. The substrate may increase a degree of isolation between the radiator and the feeding part.

Further, one layer of substrate of the multi-layer substrate is a ground plate. Grounding one layer of substrate may enable the antenna to shield clutter in an environment to improve service performance of the antenna. Generally, a larger area of the ground plate indicates a better effect of shielding clutter.

Further, in addition to using a welding material between the antenna 250 in package and the radio frequency chip 240, another packaging material may also be used to implement packaging between the antenna 250 in package and the radio frequency chip 240. As shown in FIG. 2 to FIG. 4, a packaging material 281 may coat the welding material that connects the radio frequency chip 240 to the antenna 250 in package, to strengthen a packaging effect. As shown in FIG. 2 to FIG. 4, a packaging material 282 may coat the antenna 250 in package and the radio frequency chip 240, or coat the antenna 250 in package, the radio frequency chip 240, and the parasitic patch 230, to form a whole and strengthen a packaging effect.

Further, the antenna 250 in package further includes a packaging material that packages the radiator 210 together with the first feeding part 221 and the second feeding part 222 into a whole. In other words, the radiator 210 is accommodated with the first feeding part 221 and the second feeding part 222 in the packaging material.

Further, the antenna 250 in package further includes a packaging material that is used to package a substrate. For example, the antenna 250 in package includes a ten-layer substrate. During processing, two five-layer substrates may be first processed, and then the two five-layer substrates are packaged into a whole by using the packaging material.

It may be understood that the foregoing embodiment is merely intended to help the person skilled in the art better understand technical solutions of this application, but is not intended to limit the technical solutions of this application. Modifications and other embodiments of this application will come to mind to the person skilled in the art having a benefit of guidance presented in the foregoing descriptions and related accompanying drawings. Therefore, it should be understood that this application is not limited to the specific embodiments disclosed.

FIG. 7 to FIG. 21 show a packaging structure including the multi-layer substrate. It may be understood that the embodiment shown in FIG. 7 to FIG. 21 is merely intended to help the person skilled in the art better understand technical solutions of this application, but is not intended to limit the technical solutions of this application. For example, in this application, a quantity of substrates is not limited, and arrangement positions of the first feeding part and the second feeding part on the substrate are not limited. For another example, a structure of the feeding network shown in FIG. 7 to FIG. 21 is only an example. For another example, arrangement positions of the feeding parts shown in FIG. 7 to FIG. 21 are only an example. Modifications and other embodiments of this application will come to mind to the person skilled in the art having a benefit of guidance presented in the foregoing descriptions and related accompanying drawings. Therefore, it should be understood that this application is not limited to the specific embodiments disclosed.

Figure 7:
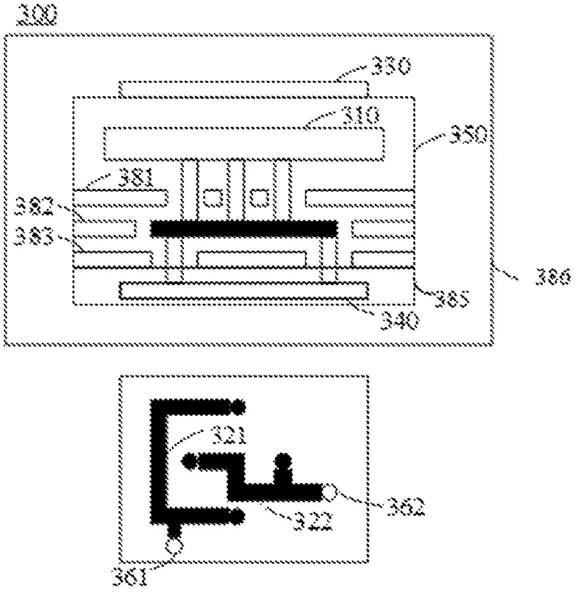
FIG. 7 is an example schematic diagram of a structure of a packaging structure according to an embodiment of this application.
Figure 8:
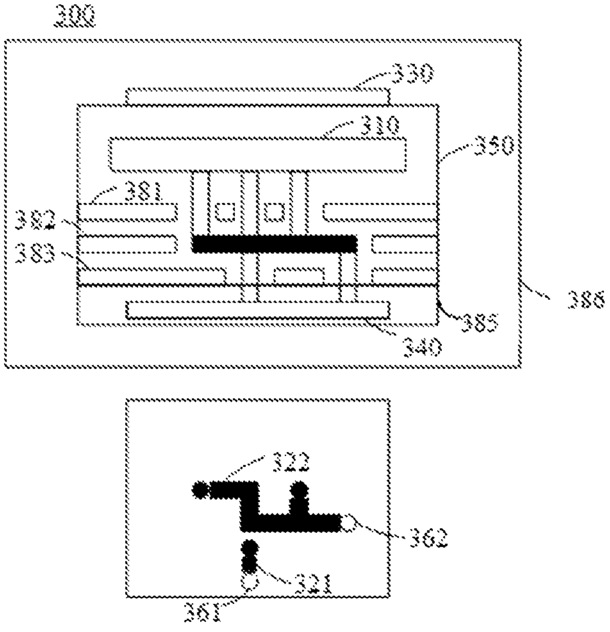
FIG. 8 is an example schematic diagram of a structure of a packaging structure according to an embodiment of this application.
Figure 9:
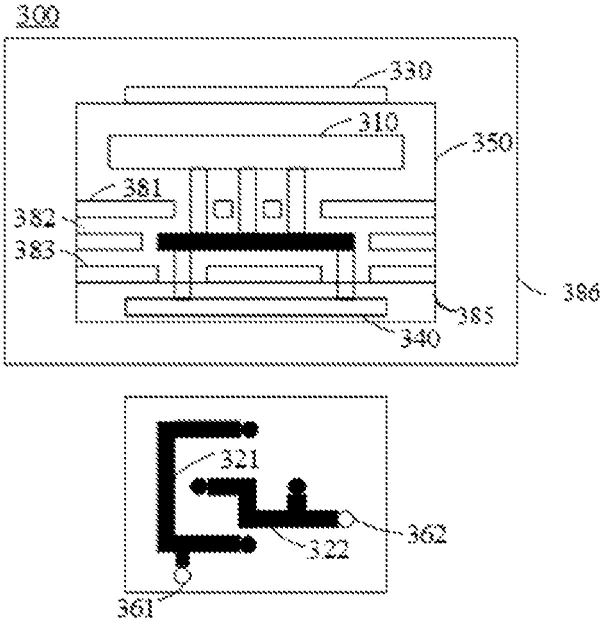
FIG. 9 is an example schematic diagram of a structure of a packaging structure according to an embodiment of this application.

FIG. 7 to FIG. 9 show a packaging structure 300 including three layers of substrates. The packaging structure 300 includes a radio frequency chip 340, an antenna 350 in package, and a parasitic patch 330 that are packaged into a whole.

The radio frequency chip 340 is configured to provide a feed for the antenna 350 in package. The parasitic patch 330 is coupled to a radiator 310 for feeding, to further increase a gain of the packaging structure 300. A shape of the parasitic patch 330 may be, for example, a shape of the parasitic patch 330 shown in FIG. 6.

The antenna 350 in package includes the radiator 310, a first substrate 381, a second substrate 382, a third substrate 383, a first feeding part 321, a second feeding part 322, a first pin 361, a second pin 362, and a dielectric material. The first feeding part 321 is electrically connected between the first pin 361 and the radiator 310, so that the radio frequency chip 340, the first pin 361, the first feeding part 321, and the radiator 310 may form a first antenna. The first antenna is a horizontal polarization antenna. The second feeding part 322 is electrically connected between the second pin 362 and the radiator 310, so that the radio frequency chip 340, the second pin 362, the second feeding part 322, and the radiator 310 may form a second antenna. The second antenna is a vertical polarization antenna. As shown in FIG. 7 to FIG. 9, both the first feeding part 321 and the second feeding part 322 are arranged on the second substrate 382. It should be understood that the first feeding part may be arranged on any layer of the first substrate 381, the second substrate 382, or the third substrate 383, and the second feeding part may be arranged on any layer of the first substrate 381, the second substrate 382, or the third substrate 383.

Further, because both the first feeding part 321 and the second feeding part 322 are arranged on the second substrate 382, the first substrate 381 may shield a signal between the first feeding part 321 and the radiator 310, and shield a signal between the second feeding part 322 and the radiator 310. The third substrate 383 may shield a signal between the first feeding part 321 and the radio frequency chip 340, and shield a signal between the second feeding part 322 and the radio frequency chip 340.

Further, the first substrate 381 or the third substrate 383 may be a ground plate to shield a signal in an ambient environment.

Further, a packaging material 385 may coat a welding material disposed between the radio frequency chip 340 and the antenna 350 in package, to strengthen a packaging effect. A packaging material 386 may coat the antenna 350 in package, the radio frequency chip 340, and the parasitic patch 330, to form a whole and strengthen a packaging effect.

As shown in FIG. 7, the first feeding part 321 is a feeding network, and the second feeding part 322 is a feeding probe. Because the first feeding part 321 is the feeding network, a bandwidth of the packaging structure 300 may be increased, a return loss of the packaging structure 300 is reduced, and a gain of the packaging structure 300 is increased.

As shown in FIG. 8, the first feeding part 321 is a feeding probe, and the second feeding part 322 is a feeding network. Because the second feeding part 322 is the feeding network, a bandwidth of the packaging structure 300 may be increased, a return loss of the packaging structure 300 may be reduced, and a gain of the packaging structure 300 may be increased.

As shown in FIG. 9, the first feeding part 321 is a feeding network, and the second feeding part 322 is a feeding network. Because the first feeding part 321 is the feeding network and the second feeding part 322 is the feeding network, a bandwidth of the packaging structure 300 may be increased, a return loss of the packaging structure 300 may be reduced, and a gain of the packaging structure 300 may be increased.

FIG. 10 to FIG. 15 show a packaging structure 400 including four layers of substrates. The packaging structure 400 may include a radio frequency chip 440, an antenna 450 in package, and a parasitic patch 430 that are packaged into a whole.

The radio frequency chip 440 is configured to provide a feed for the antenna 450 in package. The parasitic patch 430 is coupled to a radiator 410 for feeding, to further increase a gain of the packaging structure 400. A shape of the parasitic patch 430 may be, for example, a shape of the parasitic patch 430 shown in FIG. 6.

The antenna 450 in package includes the radiator 410, a first substrate 481, a second substrate 482, a third substrate 483, a fourth substrate 484, a first feeding part 421, a second feeding part 422, a first pin 461, a second pin 462, and a dielectric material. The first feeding part 421 is electrically connected between the first pin 461 and the radiator 410, so that the radio frequency chip 440, the first pin 461, the first feeding part 421, and the radiator 410 may form a first antenna. The first antenna is a horizontal polarization antenna. The second feeding part 422 is electrically connected between the second pin 462 and the radiator 410, so that the radio frequency chip 440, the second pin 462, the second feeding part 422, and the radiator 410 may form a second antenna. The second antenna is a vertical polarization antenna. The first feeding part 421 shown in FIG. 10 to FIG. 15 is arranged on the second substrate 482 or the third substrate 483, and the second feeding part 422 shown in FIG. 10 to FIG. 15 is arranged on the second substrate 482 or the third substrate 483. It should be understood that the first feeding part may be arranged on any layer of the first substrate 481, the second substrate 482, the third substrate 483, or the fourth substrate 484, and the second feeding part may be arranged on any layer of the first substrate 481, the second substrate 482, the third substrate 483, or the fourth substrate 484.

Further, at least one layer of substrate is disposed between the first feeding part 421, the second feeding part 422 and the radiator 410, and the at least one layer of substrate may shield a signal between the first feeding part 421, the second feeding part 422 and the radiator 410. At least one layer of substrate is disposed between the first feeding part 421, the second feeding part 422 and the radio frequency chip 440, and the at least one layer of substrate may shield a signal between the first feeding part 421, the second feeding part 422 and the radio frequency chip 440.

Further, the first feeding part 421 and the second feeding part 422 are disposed on different substrates, so that a degree of isolation between the first feeding part 421 and the second feeding part 422 may be increased.

Further, the first substrate 481 or the fourth substrate 484 may be a ground plate to shield a signal in an ambient environment.

Further, a packaging material 485 may coat a welding material disposed between the radio frequency chip 440 and the antenna 450 in package, to strengthen a packaging effect. A packaging material 486 may coat the antenna 450 in package, the radio frequency chip 440, and the parasitic patch 430, to form a whole and strengthen a packaging effect.

Figure 10:
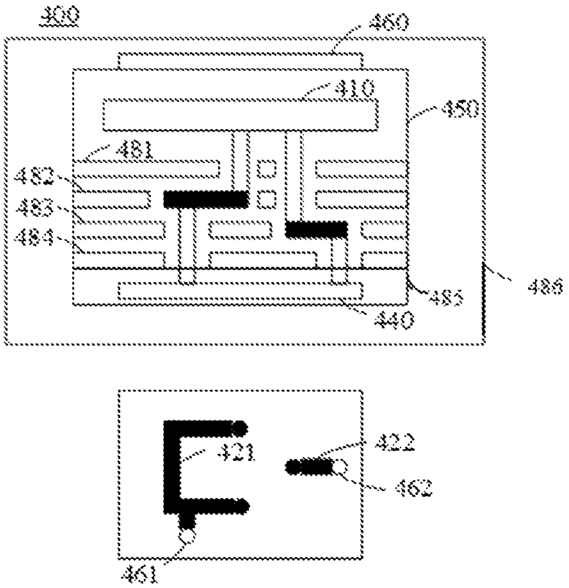
FIG. 10 is an example schematic diagram of a structure of a packaging structure according to an embodiment of this application.
Figure 11:
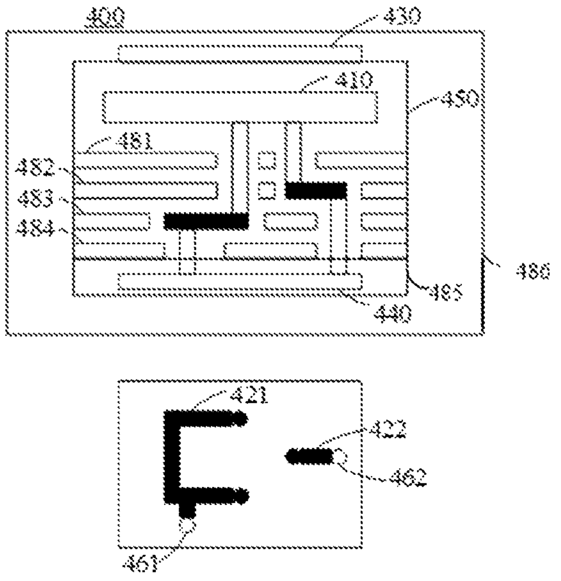
FIG. 11 is an example schematic diagram of a structure of a packaging structure according to an embodiment of this application.

As shown in FIG. 10 and FIG. 11, the first feeding part 421 is a feeding network, and the second feeding part 422 is a feeding probe. Because the first feeding part 421 is the feeding network, a bandwidth of the packaging structure 400 may be increased, a return loss of the packaging structure 400 may be reduced, and a gain of the packaging structure 400 may be increased. As shown in FIG. 10, the first feeding part 421 is located on the second substrate 482, and the second feeding part 422 is located on the third substrate 483. Substrates on which the first feeding part 421 and the second feeding part 422 are located may be further interchanged. As shown in FIG. 11, the first feeding part 421 is located on the third substrate 483, and the second feeding part 422 is located on the second substrate 482.

Figure 12:
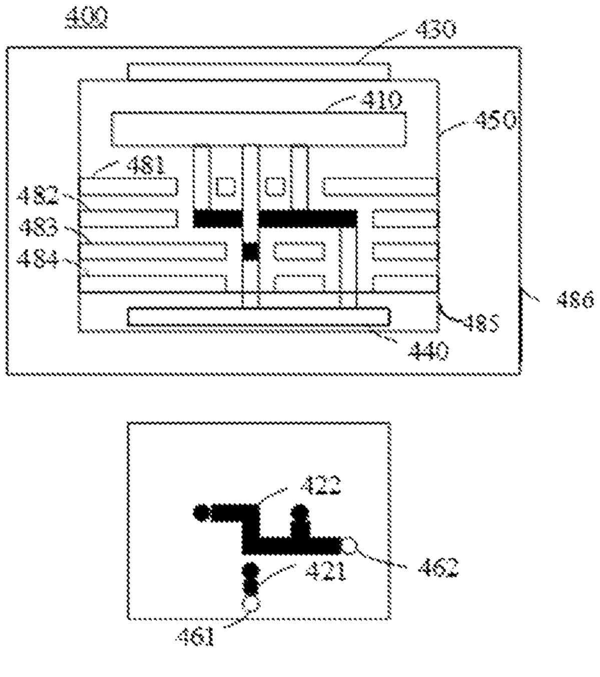
FIG. 12 is an example schematic diagram of a structure of a packaging structure according to an embodiment of this application.
Figure 13:
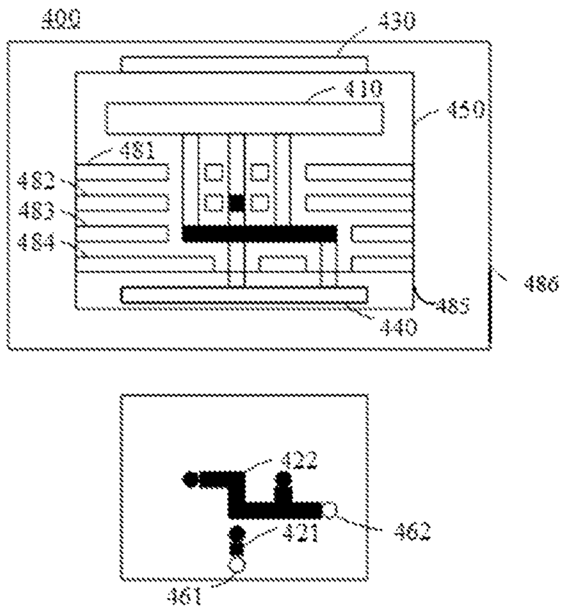
FIG. 13 is an example schematic diagram of a structure of a packaging structure according to another embodiment of this application.

As shown in FIG. 12 and FIG. 13, the first feeding part 421 is a feeding probe, and the second feeding part 422 is a feeding network. Because the second feeding part 422 is the feeding network, a bandwidth of the packaging structure 400 may be increased, a return loss of the packaging structure 400 may be reduced, and a gain of the packaging structure 400 may be increased. As shown in FIG. 12, the first feeding part 421 is located on the second substrate 482, and the second feeding part 422 is located on the third substrate 483. Substrates on which the first feeding part 421 and the second feeding part 422 are located may be further interchanged. As shown in FIG. 13, the first feeding part 421 is located on the third substrate 483, and the second feeding part 422 is located on the second substrate 482.

Figure 14:
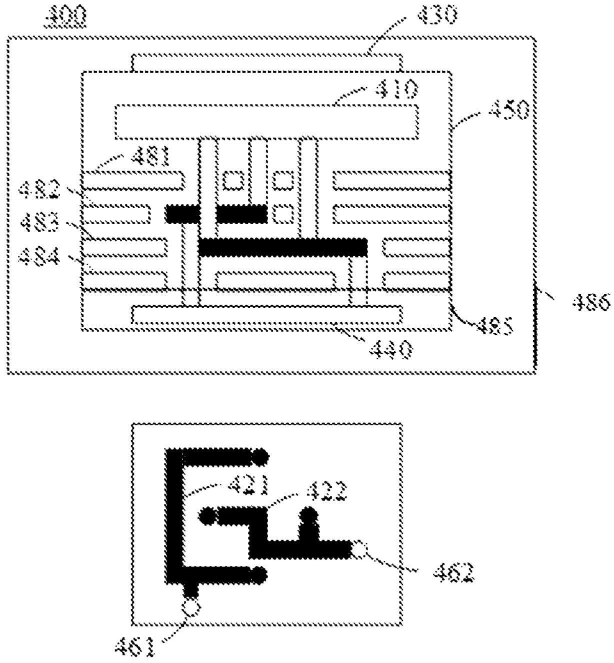
FIG. 14 is an example schematic diagram of a structure of a packaging structure according to an embodiment of this application.
Figure 15:
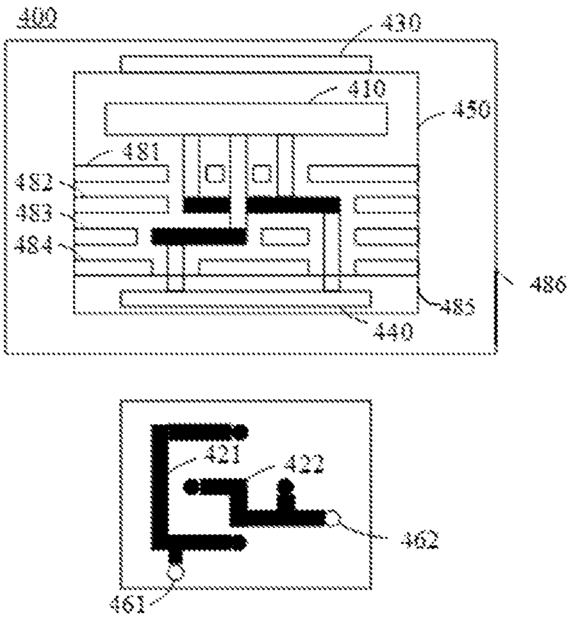
FIG. 15 is an example schematic diagram of a structure of a packaging structure according to an embodiment of this application.

As shown in FIG. 14 and FIG. 15, the first feeding part 421 is a feeding network, and the second feeding part 422 is a feeding network. Because the first feeding part 421 is a feeding network and the second feeding part 422 is a feeding network, a bandwidth of the packaging structure 400 may be increased, a return loss of the packaging structure 400 may be reduced, and a gain of the packaging structure 400 may be increased. As shown in FIG. 14, the first feeding part 421 is located on the second substrate 482, and the second feeding part 422 is located on the third substrate 483.

Substrates on which the first feeding part 421 and the second feeding part 422 are located may be further interchanged. As shown in FIG. 15, the first feeding part 421 is located on the third substrate 483, and the second feeding part 422 is located on the second substrate 482.

FIG. 16 to FIG. 21 show a packaging structure 500 including five layers of substrates. The packaging structure 500 includes a radio frequency chip 540, an antenna 550 in package, and a parasitic patch 530 that are packaged into a whole.

The radio frequency chip 540 is configured to provide a feed for the antenna 550 in package. The parasitic patch 530 is coupled to a radiator 510 for feeding, to further increase a gain of the packaging structure 500. A shape of the parasitic patch 530 may be, for example, a shape of the parasitic patch 530 shown in FIG. 6.

The antenna 550 in package includes the radiator 510, a first substrate 581, a second substrate 582, a third substrate 583, a fourth substrate 584, a fifth substrate 585, a first feeding part 521, a second feeding part 522, a first pin 561, a second pin 562, and a dielectric material. The first feeding part 521 is electrically connected between the first pin 561 and the radiator 510, so that the radio frequency chip 540, the first pin 561, the first feeding part 521, and the radiator 510 may form a first antenna. The first antenna is a horizontal polarization antenna. The second feeding part 522 is electrically connected between the second pin 562 and the radiator 510, so that the radio frequency chip 540, the second pin 562, the second feeding part 522, and the radiator 510 may form a second antenna. The second antenna is a vertical polarization antenna. The first feeding part 521 shown in FIG. 16 to FIG. 21 is arranged on the second substrate 582 or the fourth substrate 584, and the second feeding part 522 shown in FIG. 16 to FIG. 21 is arranged on the second substrate 582 or the fourth substrate 584. It should be understood that the first feeding part may be arranged on any layer of the first substrate 581, the second substrate 582, the third substrate 583, the fourth substrate 584, or the fifth substrate 585, and the second feeding part may be arranged on any layer of the first substrate 581, the second substrate 582, the third substrate 583, the fourth substrate 584, or the fifth substrate 585.

Further, at least one layer of substrate is disposed between the first feeding part 521, the second feeding part 522 and the radiator 510, and the at least one layer of substrate may shield a signal between the first feeding part 521, the second feeding part 522 and the radiator 510. At least one layer of substrate is disposed between the first feeding part 521, the second feeding part 522 and the radio frequency chip 540, and the at least one layer of substrate may shield a signal between the first feeding part 521, the second feeding part 522 and the radio frequency chip 540.

Further, the first feeding part 521 and the second feeding part 522 are disposed on different substrates, so that a degree of isolation between the first feeding part 521 and the second feeding part 522 may be increased.

Further, at least one layer of substrate is disposed between the first feeding part 521 and the second feeding part 522, so that a degree of isolation between the first feeding part 521 and the second feeding part 522 can be further increased.

Further, the first substrate 581, the third substrate 583, or the fifth substrate 585 may be a ground plate to shield a signal in an ambient environment.

Further, a packaging material 587 may coat a welding material disposed between the radio frequency chip 540 and the antenna 550 in package, to strengthen a packaging effect. A packaging material 588 may coat the antenna 550 in package, the radio frequency chip 540, and the parasitic patch 530, to form a whole and strengthen a packaging effect.

Figure 16:
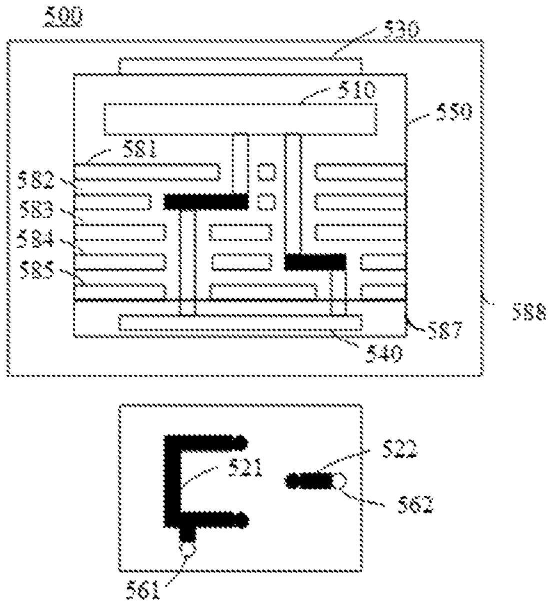
FIG. 16 is an example schematic diagram of a structure of a packaging structure according to an embodiment of this application.
Figure 17:
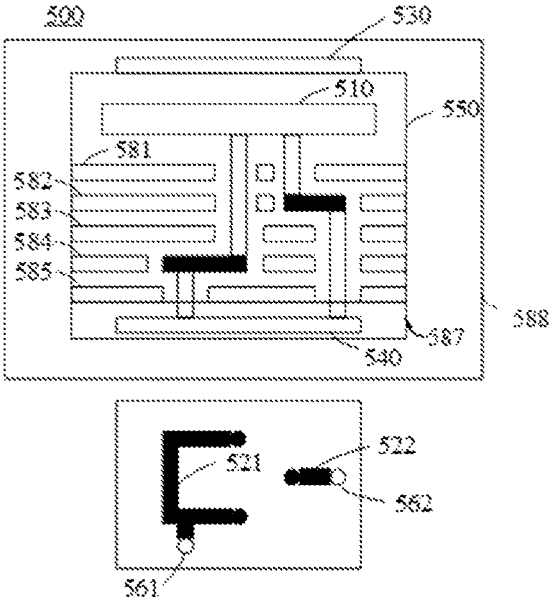
FIG. 17 is an example schematic diagram of a structure of a packaging structure according to an embodiment of this application.

As shown in FIG. 16 and FIG. 17, the first feeding part 521 is a feeding network, and the second feeding part 522 is a feeding probe. Because the first feeding part 521 is the feeding network, a bandwidth of the packaging structure 500 may be increased, a return loss of the packaging structure 500 may be reduced, and a gain of the packaging structure 500 may be increased. As shown in FIG. 16, the first feeding part 521 is located on the second substrate 582, and the second feeding part 522 is located on the fourth substrate 584. Substrates on which the first feeding part 521 and the second feeding part 522 are located may be further interchanged. As shown in FIG. 17, the first feeding part 521 is located on the fourth substrate 584, and the second feeding part 522 is located on the second substrate 582.

Figure 18:
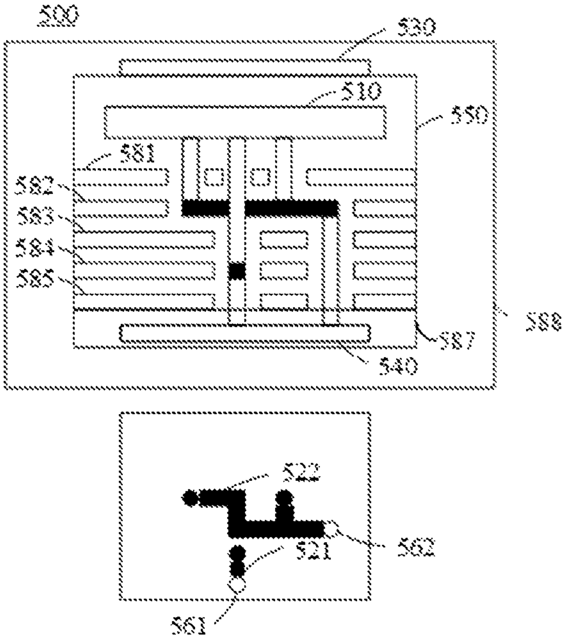
FIG. 18 is an example schematic diagram of a structure of a packaging structure according to an embodiment of this application.
Figure 19:
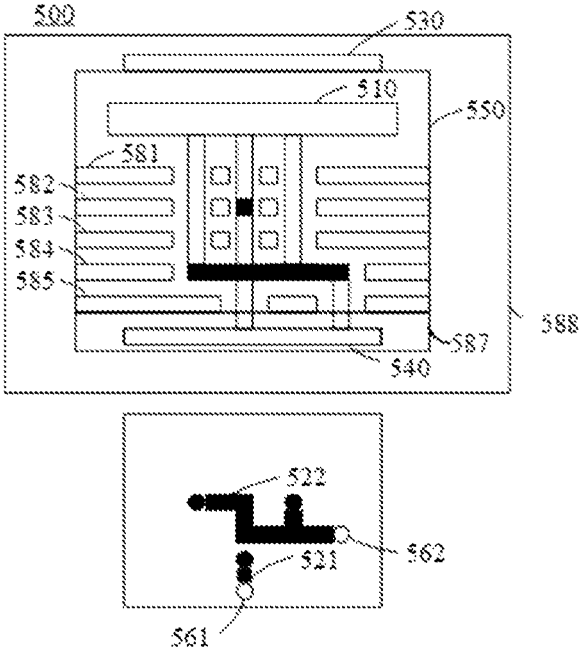
FIG. 19 is an example schematic diagram of a structure of a packaging structure according to an embodiment of this application.

As shown in FIG. 18 and FIG. 19, the first feeding part 521 is a feeding probe, and the second feeding part 522 is a feeding network. Because the second feeding part 522 is the feeding network, a bandwidth of the packaging structure 500 may be increased, a return loss of the packaging structure 500 may be reduced, and a gain of the packaging structure 500 may be increased. As shown in FIG. 18, the first feeding part 521 is located on the second substrate 584, and the second feeding part 522 is located on the fourth substrate 582. Substrates on which the first feeding part 521 and the second feeding part 522 are located may be further interchanged. As shown in FIG. 19, the first feeding part 521 is located on the fourth substrate 582, and the second feeding part 522 is located on the second substrate 584.

Figure 20:
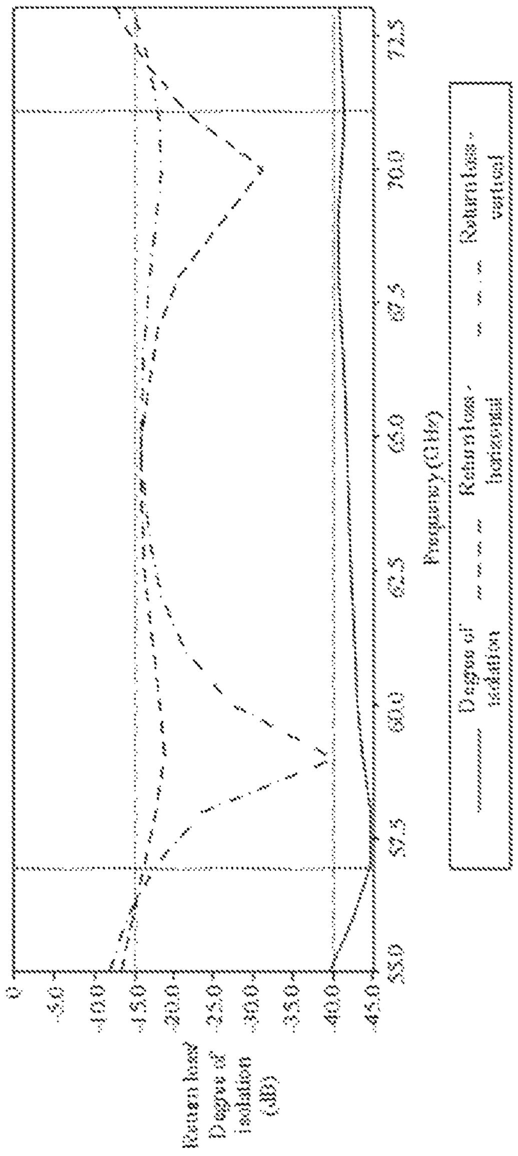
FIG. 20 is an example effect diagram of a return loss of a packaging structure according to an embodiment of this application.
Figure 21:
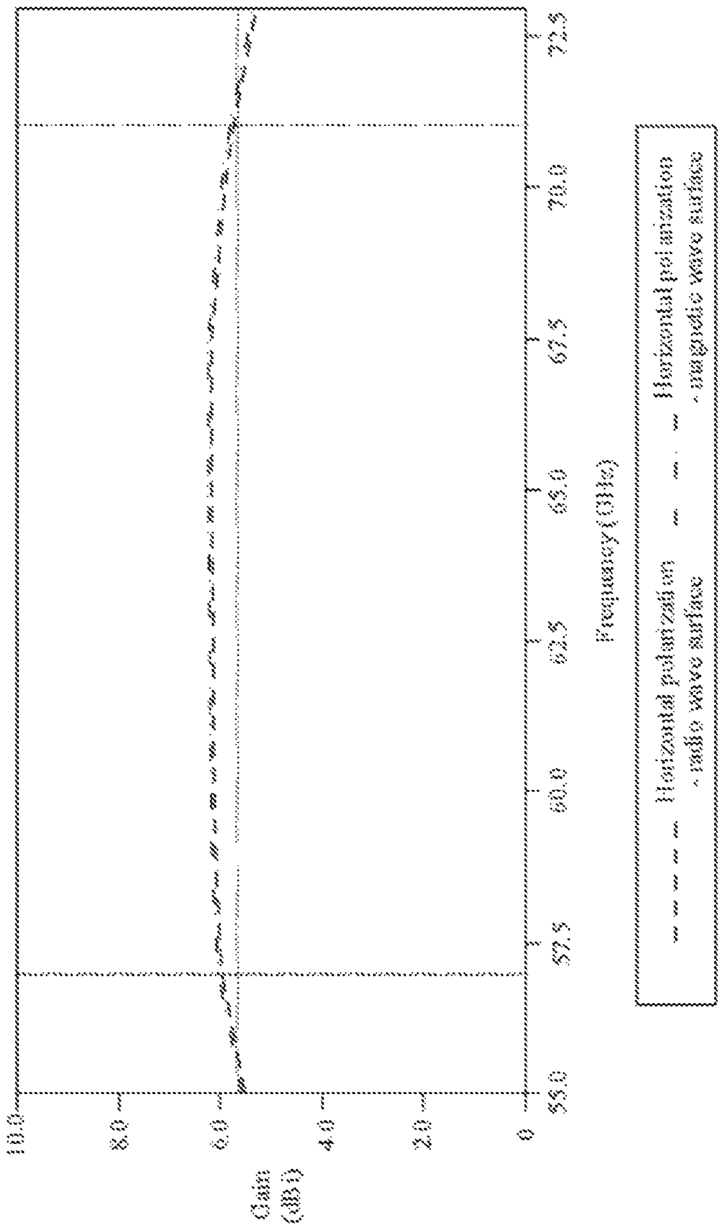
FIG. 21 is an example effect diagram of a gain of a packaging structure according to an embodiment of this application.

FIG. 20 and FIG. 21 show antenna performance implemented by using a packaging structure according to an embodiment of this application. In an example, the packaging structure may include a first feeding network, a second feeding network, and a parasitic patch, and the packaging structure may further include ten layers of substrates, where a thickness of each layer of substrate is 100 μm, and a thickness of a conducting layer of each layer of substrate is 15 μm. As shown in FIG. 20, in a range from 57 GHz to 71 GHz, a return loss of the packaging structure is below −15 dB, a degree of isolation is below −40 dB, a bandwidth reaches approximately 15 GHz, and a bandwidth percentage is approximately 25%. As shown in FIG. 21, a gain of the packaging structure is approximately 6 dBi. Because the packaging structure has excellent antenna performance, a processing margin is reserved for the packaging structure. For example, a ten-layer substrate is processed by dividing the ten-layer substrate into two five-layer substrates. Compared with a processing technology of directly processing the ten-layer substrate, a processing technology of processing the two five-layer substrates is less difficult.

This application provides a network device, and the network device includes a packaging structure.

Specifically, the packaging structure may be at least one of the packaging structure 200, the packaging structure 300, the packaging structure 400, or the packaging structure 500.

This application provides a terminal device, and the terminal device includes a packaging structure.

Specifically, the packaging structure may be at least one of the packaging structure 200, the packaging structure 300, the packaging structure 400, or the packaging structure 500.

A person of ordinary skill in the art may be aware that, in combination with the examples described in the embodiments disclosed in this specification, units and algorithm steps may be implemented by electronic hardware or a combination of computer software and electronic hardware.

Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. A part or all of the units may be selected based on an actual requirement to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of this application. The foregoing storage medium includes: any medium that can store program code, such as a USB flash drive, a removable hard disk drive, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A packaging structure, comprising:
an antenna in package including:
a radiator; and
at least first and second feeding parts; and
a radio frequency chip, wherein
the antenna in package is fastened on the radio frequency chip,
the at least first and second feeding parts are electrically connected to the radio frequency chip,
the radio frequency chip is configured to receive or transmit a radio frequency signal,
at least one of the at least first and second feeding parts provides deferential feeding for the radiator,
the first feeding part has a first polarization direction; and
the second feeding part has a second polarization direction opposite to the first polarization direction.

2. The packaging structure according to claim 1, wherein
the antenna in package further includes a first packaging material, and
the radiator and the at least first and second feeding parts are accommodated in the first packaging material.

3. The packaging structure according to claim 1, further comprising:
a first packaging material, wherein the first packaging material is used to coat a welding material disposed between the radio frequency chip and the antenna in package.

4. The packaging structure according to claim 1, further comprising:
a first packaging material, wherein the radio frequency chip and the antenna in package are accommodated in the first packaging material.

5. The packaging structure according to claim 1, wherein
the first feeding part is configured to provide deferential feeding for the radiator, and
the first feeding part includes a first feeding point and a second feeding point that are electrically connected to the radiator.

6. The packaging structure according to claim 1, wherein the antenna in package further includes:
a multi-layer substrate having a first substrate on which at least one of the at least first and second feeding parts is disposed.

7. The packaging structure according to claim 6, wherein the multi-layer substrate further includes a second substrate disposed between the first substrate and the radiator.

8. The packaging structure according to claim 6, wherein the multi-layer substrate further includes a second substrate disposed between the first substrate and the radio frequency chip.

9. The packaging structure according to claim 6, wherein the at least first and second feeding parts are disposed on different substrates of the multi-layer substrate.

10. The packaging structure according to claim 9, wherein the multi-layer substrate further includes a second substrate disposed between the at least first and second feeding parts.

11. The packaging structure according to claim 6, wherein one layer of substrate, of the multi-layer substrate, includes a ground plate.

12. The packaging structure according to claim 6, wherein
the multi-layer substrate includes N layers of substrates and M layers of substrates that are different from the N layers of substrates,
the antenna in package further includes a first packaging material, the first packaging material is used to accommodate the N layers of substrates and the M layers of substrates, and both N and M are integers greater than 1.

13. The packaging structure according to claim 6, wherein the multi-layer substrate includes a ten-layer substrate, a thickness of each layer of substrate, of the multi-layer substrate, is 100 μm, and a thickness of a conducting layer of each layer of substrate, of the multi-layer substrate, is 15 μm.

14. The packaging structure according to claim 1, further comprising:

a parasitic patch, wherein the parasitic patch is attached to the antenna in package and coupled to the radiator for feeding.

15. The packaging structure according to claim 14, further comprising:

a first packaging material, wherein the antenna in package, the radio frequency chip, and the parasitic patch are accommodated in the first packaging material.

16. The packaging structure according to claim 1, wherein isolation vias are provided on a material that coats the at least first and second feeding parts.

17. A network device, comprising:

a packaging structure having:

an antenna in package including:

a radiator; and at least first and second feeding parts; and a radio frequency chip, wherein the antenna in package is fastened on the radio frequency chip, the at least first and second feeding parts are electrically connected to the radio frequency chip, the radio frequency chip is configured to receive or transmit a radio frequency signal, at least one of the at least first and second feeding parts provides deferential feeding for the radiator, the first feeding part has a first polarization direction; and the second feeding part has a second polarization direction opposite to the first polarization direction.

18. A terminal device, comprising:

a packaging structure having:

an antenna in package including:

a radiator; and at least first and second feeding parts; and a radio frequency chip, wherein the antenna in package is fastened on the radio frequency chip, the at least first and second feeding parts are electrically connected to the radio frequency chip, the radio frequency chip is configured to receive or transmit a radio frequency signal, at least one of the at least first and second feeding parts provides deferential feeding for the radiator, the first feeding part has a first polarization direction; and the second feeding part has a second polarization direction opposite to the first polarization direction.

19. The packaging structure according to claim 1, wherein the first polarization direction is at a first angle of polarization and the second polarization direction is at a second angle of polarization, and the first angle and the second angle have a same value in opposite directions.

20. The packaging structure according to claim 1, wherein the first and second feeding parts form a feeding network;

the feeding network includes a first feeding point and a second feeding point; and the first feeding point and the second feeding point may form a first resonance point and a second resonance point.

* * * * *